US011249793B2

(12) United States Patent
Gupta et al.

(10) Patent No.: US 11,249,793 B2
(45) Date of Patent: Feb. 15, 2022

(54) EXECUTING A PIPELINE COMMAND SEQUENCE DESIGNED FOR EXECUTION ON A SINGLE NODE ACROSS A FLEET OF NODES

(71) Applicant: Shoreline Software, Inc., Redwood City, CA (US)

(72) Inventors: Anurag Gupta, Atherton, CA (US); Charles Ian Ormsby Cary, Redwood City, CA (US)

(73) Assignee: Shoreline Software, Inc., Redwood City, CA (US)

(*) Notice: Subject to any disclaimer, the term of this patent is extended or adjusted under 35 U.S.C. 154(b) by 157 days.

(21) Appl. No.: 16/696,626

(22) Filed: Nov. 26, 2019

(65) Prior Publication Data

US 2021/0157630 A1 May 27, 2021

(51) Int. Cl.
*G06F 9/46* (2006.01)
*G06F 9/48* (2006.01)

(52) U.S. Cl.
CPC ............ *G06F 9/466* (2013.01); *G06F 9/4881* (2013.01)

(58) Field of Classification Search
CPC ................................ G06F 9/466; G06F 9/4881
See application file for complete search history.

(56) References Cited

U.S. PATENT DOCUMENTS

| 7,093,088 | B1 | 8/2006 | Todd et al. |
| 7,469,284 | B1 | 12/2008 | Dubrovsky et al. |
| 8,930,954 | B2 | 1/2015 | Hildrum |
| 9,864,725 | B1 | 1/2018 | DeSantis et al. |
| 9,875,235 | B1 | 1/2018 | Das et al. |
| 10,108,458 | B2 | 10/2018 | Chen |
| 10,628,228 | B1 | 4/2020 | Theunissen et al. |
| 10,713,280 | B2 | 7/2020 | Horowitz et al. |
| 11,036,560 | B1* | 6/2021 | Mcpherson ........... G06F 9/5077 |
| 11,133,989 | B2 | 9/2021 | Gupta et al. |
| 11,157,282 | B2 | 10/2021 | Gupta et al. |
| 2005/0038890 | A1 | 2/2005 | Masuda et al. |
| 2006/0090165 | A1 | 4/2006 | Martin et al. |
| 2010/0058349 | A1 | 3/2010 | Diwakar et al. |
| 2014/0215077 | A1 | 7/2014 | Soudan et al. |
| 2015/0095917 | A1 | 4/2015 | Challenger et al. |
| 2015/0160966 | A1 | 6/2015 | Archer et al. |
| 2016/0103698 | A1 | 4/2016 | Yang et al. |

(Continued)

OTHER PUBLICATIONS

Gupta, Anurag et al., "Executing a Pipeline Command Sequence Designed For Execution on a Single Node across a Fleet of Nodes," U.S. Appl. No. 16/684,001, filed Nov. 14, 2019, Specification, Claims, Abstract, and Drawings, 36 pages.

*Primary Examiner* — Wissam Rashid
(74) *Attorney, Agent, or Firm* — Carr & Ferrell LLP

(57) ABSTRACT

Described are systems and methods for executing a pipeline command sequence designed for execution on a single node across a fleet of nodes. An example method may commence with receiving the pipeline command sequence. Based on a type of the pipeline command sequence, a subset of available nodes for optimal execution of the pipeline command sequence across the fleet of nodes may be determined. The method may continue with defining a plurality of tasks for the subset of available nodes. The method may further include translating the pipeline command sequence into the plurality of tasks and executing the plurality of tasks on the subset of available nodes.

20 Claims, 7 Drawing Sheets

(56) References Cited

U.S. PATENT DOCUMENTS

| | | |
|---|---|---|
| 2017/0255496 A1 | 9/2017 | Deng et al. |
| 2017/0279703 A1 | 9/2017 | Wasmundt et al. |
| 2017/0310542 A1 | 10/2017 | Nair et al. |
| 2017/0329648 A1 | 11/2017 | Ren et al. |
| 2017/0371968 A1 | 12/2017 | Horowitz et al. |
| 2019/0155660 A1 | 5/2019 | McQuighan et al. |
| 2019/0196672 A1 | 6/2019 | Mikheev |
| 2020/0050487 A1 | 2/2020 | Garla et al. |
| 2020/0117434 A1 | 4/2020 | Biskup et al. |
| 2020/0174840 A1 | 6/2020 | Zhao et al. |
| 2021/0149678 A1 | 5/2021 | Gupta et al. |
| 2021/0194773 A1 | 6/2021 | Gupta et al. |
| 2021/0255868 A1 | 8/2021 | Gupta et al. |
| 2021/0263931 A1 | 8/2021 | Gupta et al. |

\* cited by examiner

EXECUTING A PIPELINE COMMAND SEQUENCE DESIGNED FOR EXECUTION ON A SINGLE NODE ACROSS A FLEET OF NODES

TECHNICAL FIELD

The present technology relates generally to distributed execution of computing tasks, and more particularly, but not by limitation, to execution of pipeline command sequences designed for execution on a single node across a fleet of nodes.

BACKGROUND

Customers of network systems and services expect their systems to be running and perform consistently. Jitter, downtime, and even maintenance windows in performance are no longer acceptable. Customers run their systems around the clock and expect them to run without any interruptions or performance loss. A customer may want to define a task as a simple pipeline command designed for execution on a single machine. However, the task may require resources and data going beyond the ability of the machine. Currently, there is no transparent way to translate a pipeline command into a plurality of tasks for execution across a fleet of nodes.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, a method for executing a pipeline command sequence designed for execution on a single node across a fleet of nodes is provided. The method may commence with receiving the pipeline command sequence. Based on a type of the pipeline command sequence, a subset of available nodes for optimal execution of the pipeline command sequence across the fleet of nodes may be determined. The method may continue with defining a plurality of tasks for the subset of available nodes. The method may further include translating the pipeline command sequence into the plurality of tasks and executing the plurality of tasks on the subset of available nodes.

According to one example embodiment of the disclosure, a system for executing a pipeline command sequence designed for execution on a single node across a fleet of nodes is provided. The system may include a front end module and a backend module communicatively coupled to each other. The front end module may be configured to receive the pipeline command sequence. The backend module may be configured to determine, based on a type of the pipeline command sequence, a subset of available nodes for optimal execution of the pipeline command sequence across the fleet of nodes. The backend module may be further configured to define a plurality of tasks for the subset of available nodes and translate the pipeline command sequence into the plurality of tasks. Upon translating the pipeline command sequence into the plurality of tasks, the plurality of tasks may be executed on the subset of available nodes.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
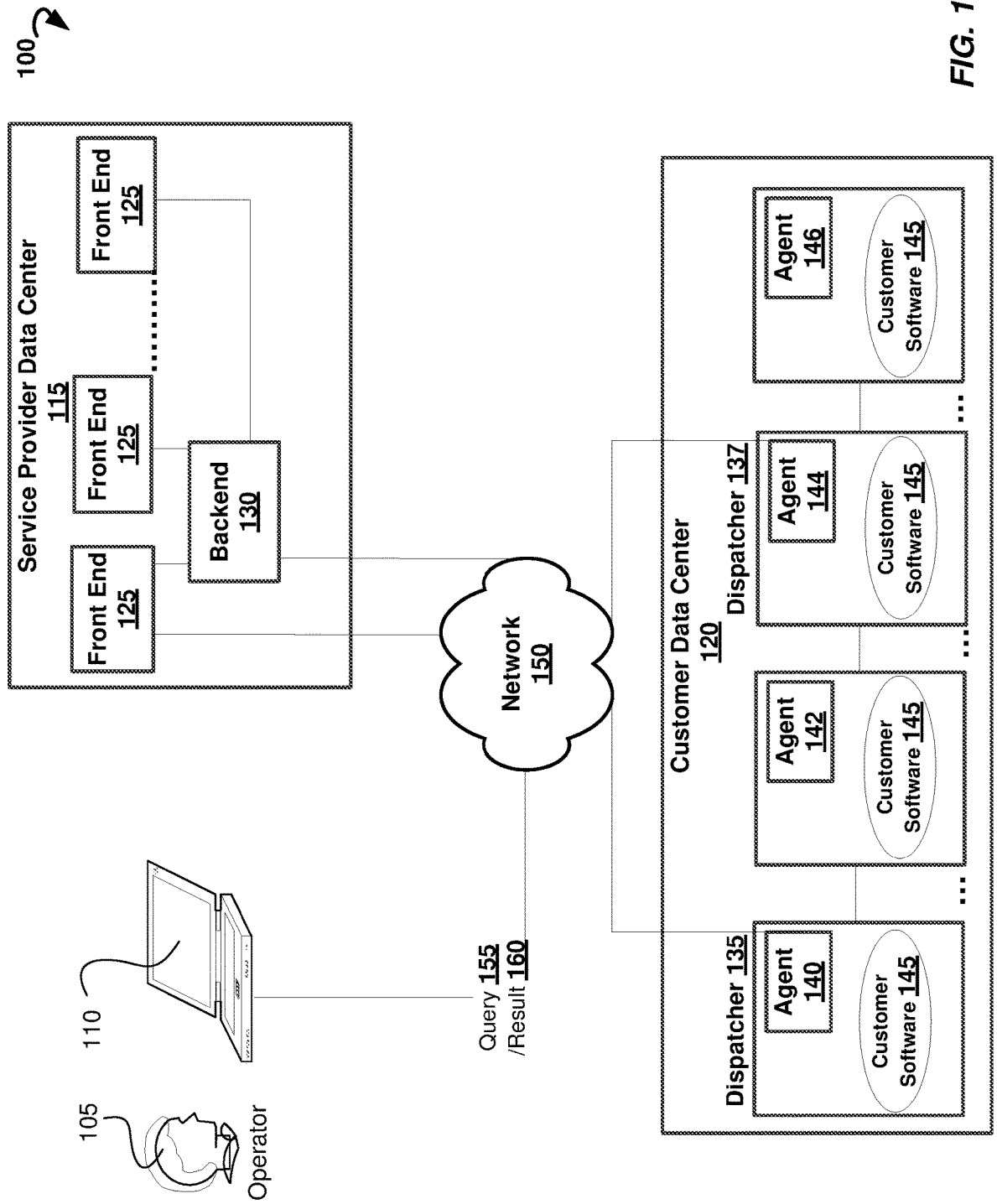
FIG. 1 is a high-level schematic diagram of an example computing architecture of a computing environment for implementing systems and methods for executing a pipeline command sequence designed for execution on a single node across a fleet of nodes.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure is directed to various embodiments of systems and methods for executing a pipeline command sequence designed for execution on a single node across a fleet of nodes. The systems and methods may facilitate transparent execution of pipeline commands on a plurality of nodes. According to some embodiments, customers are able to define tasks they want to run. In an example embodiment, tasks can we written using native scripts. A task can be defined for a simple pipelined execution as though it would be run on a single machine. Operations of the task can be written in native scripts such as Shell, Python, and so forth. Thus, various native shell languages (e.g., Shell and Python) can be integrated into a single orchestration pipeline. The system can handle converting the script to one or more fleet-wide parallel, distributed, scalable, and automated flows. Once converted, the flows can be run across thousands or millions of managed resources. An example execution of pipeline command sequences includes on-demand distribution of code artifacts, libraries, and runtime versions across the fleet of nodes. Additionally, exceptions to handle error cases can be raised and routed to other task pipelines and continuations provided back when the issue is resolved. The method and system can also provide a governance model for controlling executions based on the number of nodes impacted and on whether the task has been run through a development/testing fleet of nodes. The governance model can also provide visibility as to which node is executing the task, which node has approved the task, and so forth.

An example method for executing a pipeline command sequence designed for execution on a single node across a fleet of nodes can commence with receiving the pipeline command sequence. Based on a type of the pipeline command sequence, a subset of available nodes for optimal execution of the pipeline command sequence across the fleet of nodes can be determined. The method can further include defining a plurality of tasks for the subset of available nodes. Upon defining the plurality of tasks, the pipeline command sequence can be translated into the plurality of tasks. The method can then proceed with execution of the plurality of tasks on the subset of available nodes.

Referring now to the drawings, FIG. 1 is a high-level schematic diagram of an example computing architecture (hereinafter referred to as architecture 100) of a computing environment for implementing systems and methods for executing a pipeline command sequence designed for execution on a single node across a fleet of nodes. The architecture 100 can include an operator 105, a computing device 110 associated with the operator 105, a service provider data center 115, a customer data center 120, and a network 150. The service provider data center 115 may include a plurality of front ends 125 (including front end nodes) and a backend 130 (including backend nodes). In an example embodiment, the service provider data center 115 may act as a system for executing a pipeline command sequence designed for execution on a single node across a fleet of nodes. In some embodiments, the system may include a server or cloud-based computing device configured to specifically perform the operations described herein. The system can also include a plurality of distributed computing systems that cooperatively provide the features of the system. For example, individual systems of the plurality of distributed computing systems can provide one or more unique functions or services. In some embodiments, the system can comprise a cloud computing environment or other similar networked computing system.

The customer data center 120 may include a plurality of agents 140, 142, 144, and 146 associated with customer software 145. As used herein, an agent is a software that runs on a resource associated with the customer (such as a customer computer or a node), collectively referred to as agents. A subset of agents that can directly communicate with the system for executing a pipeline command sequence designed for execution on a single node across a fleet of nodes is referred to herein as dispatchers. Only the agents that act as dispatchers are allowed to communicate with the system for security reasons because the customer may not want to have all of their resources/nodes/computers directly communicate with resources/nodes/computers outside of a data center/computing environment of the customer. Therefore, some of the agents, e.g., agents 140 and 144, may act as dispatchers 135 and 137 and may communicate with the backend 130 of the service provider data center 115. Each of the computing device 110, the service provider data center 115, and the customer data center 120 may communicate with each other via the network 150.

The network 150 may include the Internet, a computing cloud, Representational State Transfer services cloud, and any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Limited duplex paging network, Bluetooth radio, or an IEEE 802.11-based radio frequency network. The network 150 can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking. The network 150 may include a network of data processing nodes, also referred to as network nodes, that are interconnected for the purpose of data communication.

When the operator 105 sends a query 155, the query 155 may be received by one of front ends 125. The one of front ends 125 can provide the query 155 to the backend 130. The backend 130 may process the query 155 by defining a plurality of tasks for a subset of available nodes. The query 155 may be then provided to and processed by a plurality of agents selected from agents 140, 142, 144, and 146. The result 160 of the execution of the query 155 can be provided to the computing device 110.

Figure 2:
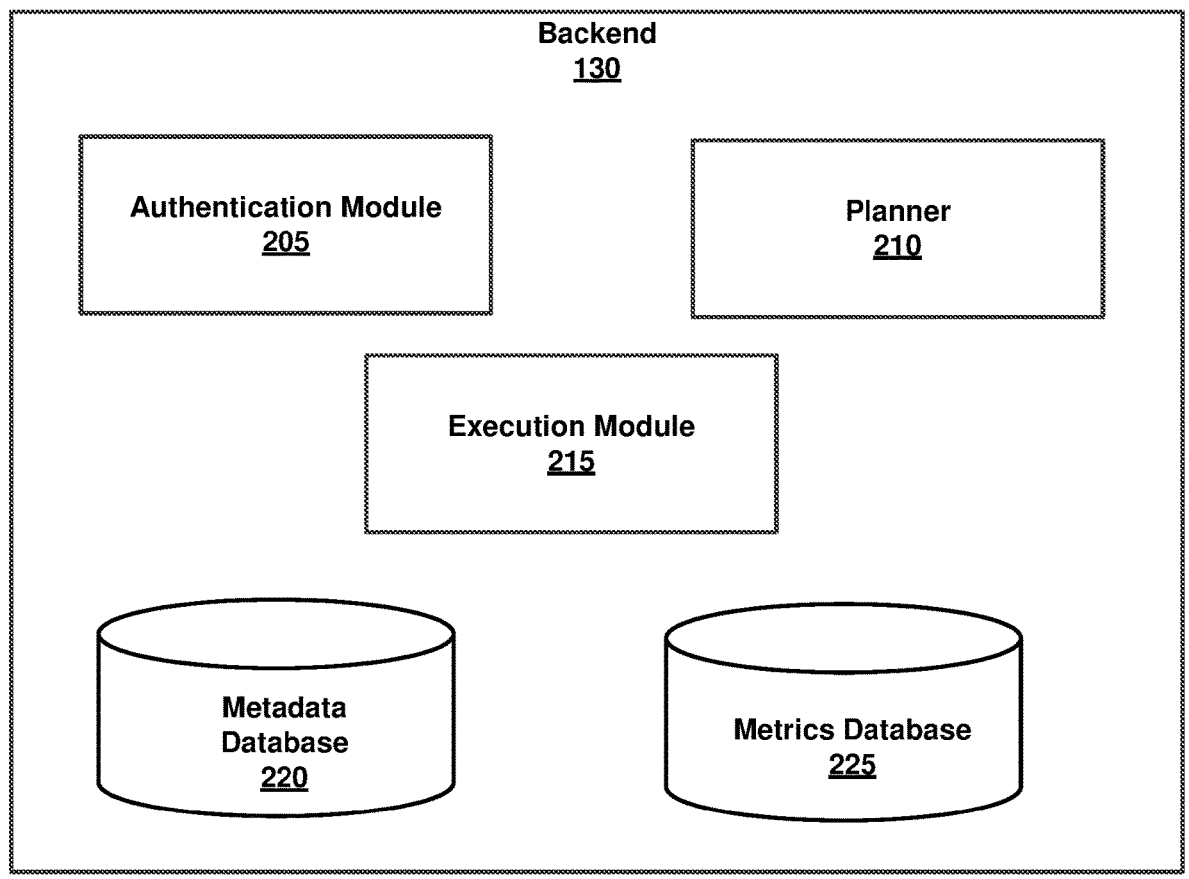
FIG. 2 is a block diagram illustrating a backend module of the system for executing a pipeline command sequence designed for execution on a single node across a fleet of nodes, according to some embodiments.

FIG. 2 is a block diagram illustrating a backend module of the system for executing a pipeline command sequence designed for execution on a single node across a fleet of nodes. The system is shown as a service provider data center 115 in FIG. 1. The backend module is shown as a backend 130. The backend 130 may include an authentication module 205, a planner 210, an execution module 215, a metadata database 220, and a metrics database 225. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Each of the front end modules shown as front ends 125 in FIG. 1 can be configured to receive requests from a customer. A request may be a pipeline command sequence (i.e., may include one or more pipeline steps). A pipeline command sequence is a sequence of commands separated by a control operator, such as "|" or "|&". In the pipeline command sequence, the output of each command is connected to the input of the next command (i.e., each command uses the output of the previous command as an input). For example, a request of the customer can include "list host|CPU|average" to compute an average processing performance of hosts. In an example embodiment, the front end 125 may include a network load balancer that receives the request. The backend 130 may have a plurality of backend nodes. The front end 125 can authenticate the customer that sends the request and perform a backend node mapping by checking a local cache to find customer information. If a corresponding entry with the customer information is present in the local cache, the front end 125 uses the corresponding backend node for routing the request. If an entry is not present, the front end 125 makes a request to the metadata database to fetch the backend node for the customer. The front end 125 can update its local cache with the customer information received from the metadata database. When the mapping is completed, the front end 125 can forward a message to the selected backend node of the backend 130. The message can include a front end identifier and a request, such that the front end 125 can receive results of the execution from the backend node later. The front end 125 may translate different interfaces/protocols into pipeline commands. For example, the request can come in from a command line interface or a website dashboard and may be then translated by the front end 125 into a common form, such as one or more pipeline commands, to be sent to the backend 130.

The backend 130 can receive the pipeline command sequence and return a checkpoint number to identify the receipt of the pipeline command sequence to the front end if the backend 130 determines that the customer is hosted by the backend node to which the pipeline command sequence was sent by the front end. The backend 130 may use the authentication module 205 to authenticate the customer. In an example embodiment, the authentication of the customer may include identifying the customer and mapping the request to one or more backend nodes associated with the customer. The backend 130 may identify the customer based on customer information stored in the metadata database 220. The metrics database 225 may store metrics associated with the system under control of the customer. If the backend node does not host the customer, an error message can be returned to the front end. In this case, the front end may send a request to the metadata database to adjust the mapping of the customer to the backend accordingly. As used herein, the system under control is a system of a customer that needs to be monitored and controlled. An example system under control may include an enterprise system, a system of a plurality of computing devices, a cloud system, a web-based system, a cloud-based system, and so forth.

Upon receipt of the pipeline command sequence, the backend 130 can start processing of the pipeline command sequence (i.e., processing of the one or more pipeline commands received from the front end 125). The backend 130 reviews a local metadata database to determine a sequence number committed (i.e., the largest sequence number that is not for an outstanding request). In an example embodiment, upon receiving the pipeline command sequence, the backend may selectively convert the pipeline command sequence into a shell equivalent command designed to run on the single node.

The backend 130 may determine a type of the pipeline command sequence. Based on the type of the pipeline command sequence, the backend 130 may determine a subset of available nodes for optimal execution of the pipeline command sequence across the fleet of nodes. In an example embodiment, the determining the subset of available nodes may further include ensuring that available nodes are available consistently. Specifically, the backend 130 may further use the planner 210 to plan an execution of the pipeline command sequence based on resources available to the customer and define the plurality of tasks for the subset of available nodes. The planner 210 may be configured to ascertain resources available to the customer for the execution plan and create an execution plan for the pipeline command sequence based on the one or more pipeline steps. The planner 210 may further translate the pipeline command sequence into one or more flows for parallel execution on the available resources. During the planning, the largest sequence number for the request to be completed, i.e., the checkpoint sequence number (CSN) for the pipeline command sequence, can be determined. The CSN can be then passed back to the front end. The backend 130 can locally store information as to which front end node was interested in the result of this CSN and use this information later to respond to the front end node.

Upon determining the subset of available nodes, the backend 130 may define a plurality of tasks for the subset of available nodes. Based on the defined plurality of tasks, the backend 130 can translate the pipeline command sequence into the plurality of tasks and provide the plurality of tasks to the subset of available nodes for execution. Additionally, upon defining of the plurality of tasks for the subset of available nodes, the backend 130 may build a list of tasks for each of the subset of available nodes. The translation of the pipeline command sequence into the plurality of tasks may include building a tree for executing the plurality of tasks on the subset of available nodes. The translation of the pipeline command sequence into the plurality of tasks may further include auto-binding of arguments (parameter values) across pipeline steps and language data types.

In an example embodiment, the plurality of tasks can include one or more of the following: providing a resource parameter, providing a new version of software, converting the pipeline command sequence into a native shell script, distributing a code artifact, distributing a runtime version, distributing a library, and so forth. The native shell script may include a Shell or Python. Each of the subset of available nodes may execute the plurality of tasks and provide a result. Specifically, the backend 130 can be further configured to manage a plurality of agents associated with the resources, including the agents that act as dispatchers. The plurality of the agents can be configured to run the one or more flows. Therefore, the backend 130 can manage execution of the plurality of tasks via the execution module 215 through agents installed on the plurality of available resources. Each agent may have an execution module for executing the plurality of tasks. The agents running on the resources may be in communication with each other. The results of execution of the plurality of the tasks by the subset of available nodes may be reassembled into a response to the pipeline command sequence. The backend 130 can be further configured to provide the response to the customer by sending the response to the front end.

Figure 3:
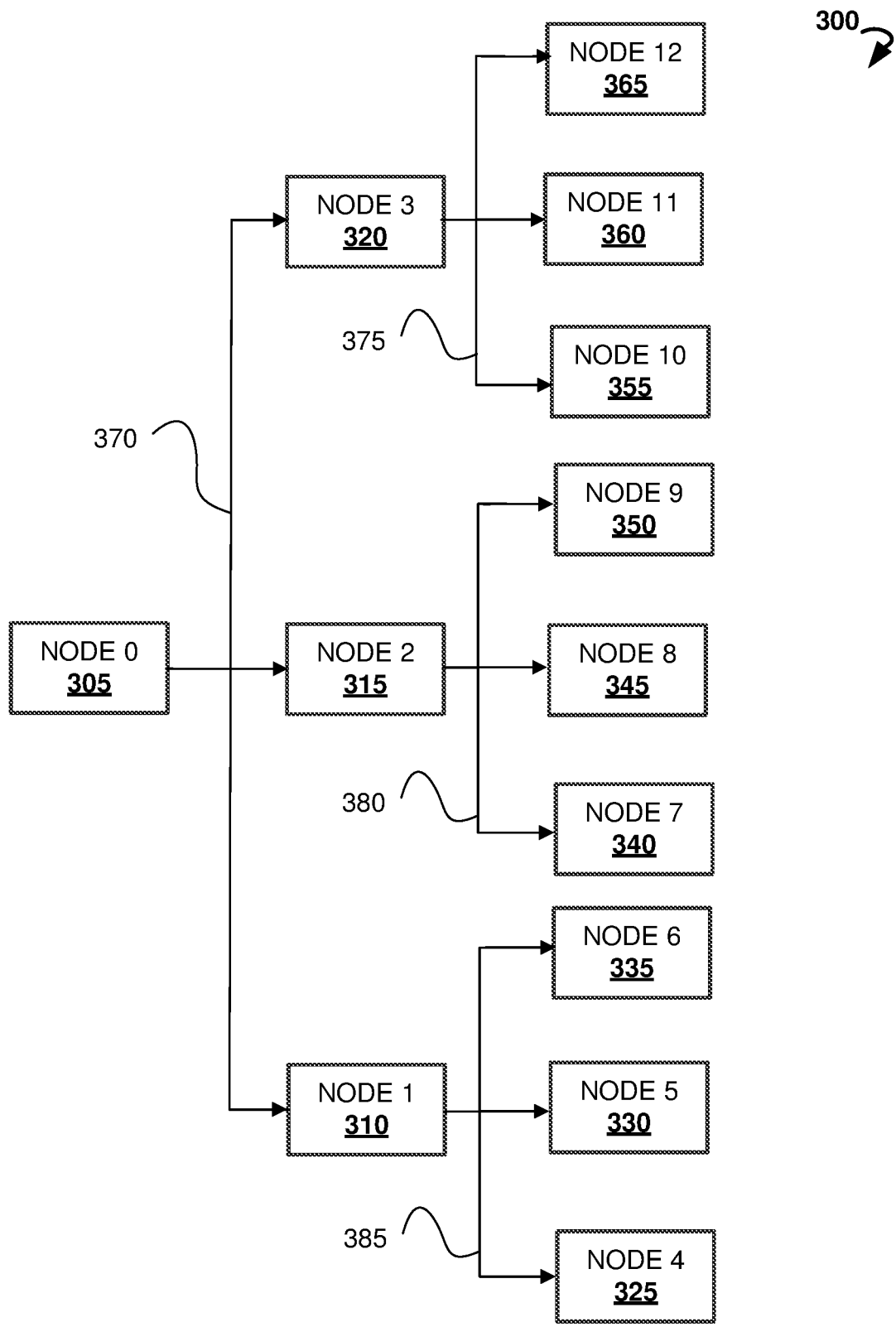
FIG. 3 shows a fleet of nodes across which a pipeline command sequence may be executed, according to an example embodiment.

FIG. 3 shows a fleet 300 of nodes across which a pipeline command sequence can be executed, according to an example embodiments. The connections of nodes shown in FIG. 3 create a dispatch tree 370 of nodes. The dispatch tree 370 is used to reduce distribution of a message (notification) on a per node basis (i.e., individual nodes are only responsible for messaging a small set of other nodes). Redundant trees 375, 380, and 385 may help address network faults by providing multiple paths to nodes for delivery of a message. The backend may use the planner to plan and control execution of the plurality of tasks across the fleet 300 of nodes. The planner may be configured to ascertain resources of the fleet 300 available to the customer and create an execution plan for the pipeline command sequence based on the one or more pipeline steps. The planner may translate the pipeline command sequence into one or more flows for parallel execution on the available resources of the fleet 300. For example, the pipeline command sequence designed for execution on a single node 305 can be translated into the plurality of tasks for nodes 310, 315, and 320, as well as the plurality of tasks for nodes 325, 330, and 335, nodes 340, 345, and 350, and nodes 355, 360, and 365.

During the planning phase, the largest sequence number for the pipeline command sequence to be completed, i.e., the checkpoint sequence number (CSN) for the pipeline command sequence, can be determined. The CSN can then be passed back to the front end. The backend 130 can store information locally, which includes information concerning which front end node was interested in the result of this CSN, and use this information later to respond to the front end node.

Figure 4:
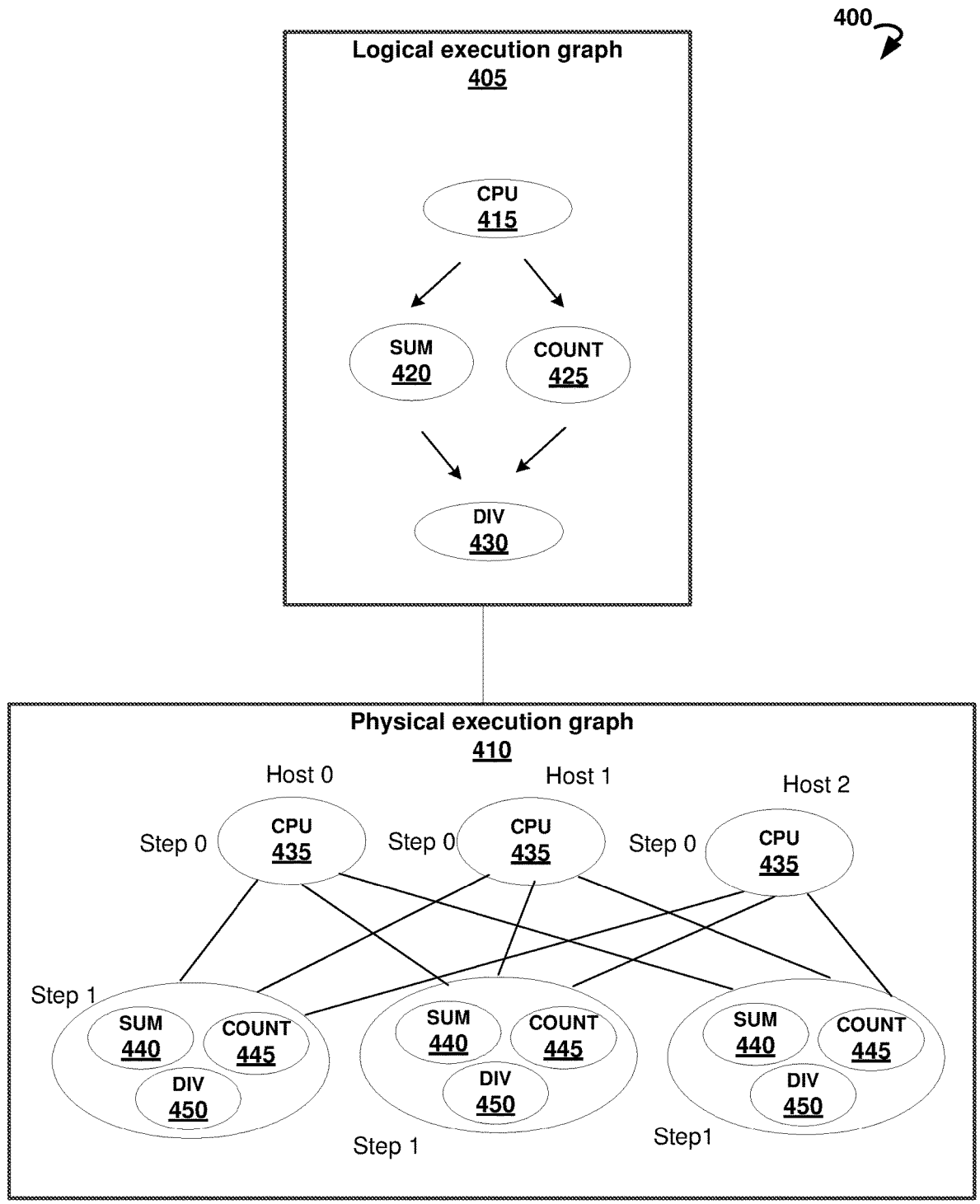
FIG. 4 shows a schematic diagram illustrating a logical execution graph and a physical execution graph, according to an example embodiment.

FIG. 4 shows a schematic diagram 400 illustrating a logical execution graph 405 and a physical execution graph 410. To define a plurality of tasks for the subset of available nodes, the planner may analyze the pipeline command sequence and generate a local execution graph and a physical execution graph. The logical planning can include transforming a statement associated with the pipeline command sequence into equivalent statements to maximize parallelism and minimize execution time. During the logical planning, a map can be created based on the linking of one or more strings to function calls. The one or more strings can be transformed into equivalent statements for a parallel execution. The parallel execution can be optimized based on the resources. The output provided by the logical planning can include a graph of steps for the parallel execution. Symbols can be added to the graph, e.g., "sum," "count," and "div" (division). The logical execution graph 405 shows a central processing unit (CPU) 415 performing SUM 420 and COUNT 425 operations as well as performing a DIV 430 operation.

After the logical planning is completed, a plan with a plurality of steps is provided, but the resulting plan is not executable because some steps are abstract and have not been bound to physical hosts for execution yet. To resolve these issues, physical planning is necessary. FIG. 4 illustrates an example physical execution graph 410, which includes a plurality of CPUs 435 associated with hosts (resources) and performing SUM 440 and COUNT 445 operations as well as performing a DIV 450 operation. The physical planning can commence with determining available resources for physical execution of the logical execution plan. The logical execution plan may include steps for the parallel execution determined based on the logical planning. To this end, the backend repeatedly looks up the plan resulting from the logical planning, looks up steps that have their dependencies met, and queries the local metadata database. The local metadata database then response to these requests (Step 0 in FIG. 4). These steps are context gathering steps at which calls to CPUs (hosts) are performed.

Figures 5A, 5B:
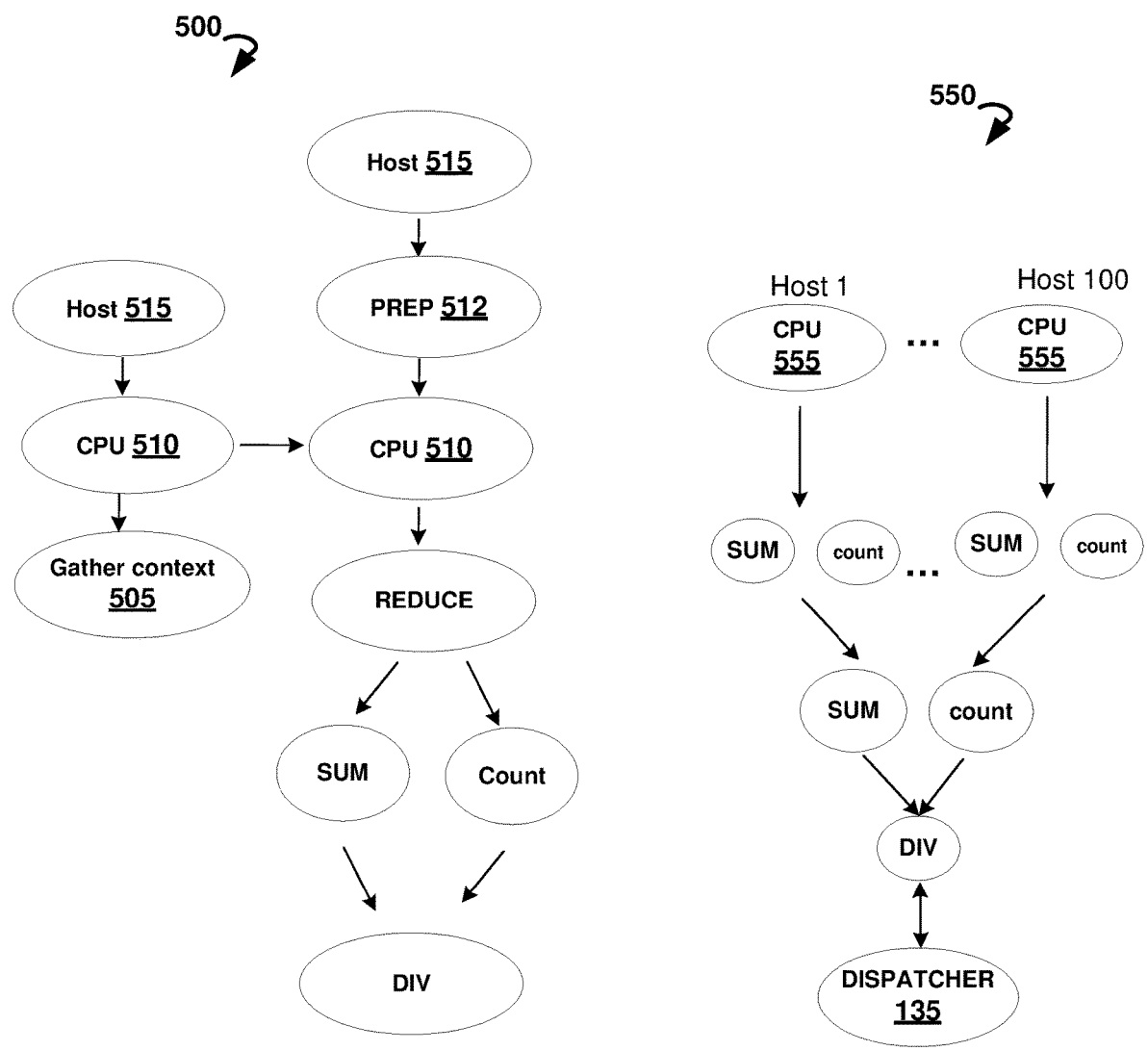
FIG. 5A shows steps performed to gather context associated with hosts, according to an example embodiment
FIG. 5B shows steps performed by a plurality of nodes, according to an example embodiment.

FIG. 5A shows steps 500 performed to gather context, according to an example embodiment. With the logical execution plan and the output of the context gathering 505 from CPUs 510 of hosts 515 (when the host 515 performs some preprocessing 512 and each of CPUs 510 performs reduce, SUM, COUNT, and DIV operations), the backend can make a call to the planner. The context gathering results and the logical execution plan can be passed to the planner. The planner can use the fact that it has 100 hosts and breaks up an average into SUM and COUNT so that the planner can parallelize the local call to CPUs and then leverage a tree to compute the average. First, all of the nodes can gather their current CPU utilization in parallel. Each CPU can perform SUM and COUNT operations and perform a DIV operation to determine available resources. The CPUs (e.g., 100 CPUs in total) can provide a return message to advertise that they are available for processing. See FIG. 5B showing steps 550 performed by each of CPUs 555, including SUM, COUNT, and DIV operations to compute the average of each host. Every 10 hosts can then forward their utilization to one host to compute SUBSUM and COUNT. Finally, the resultant 10 SUMS and COUNTS can be forwarded to a final host that takes a final SUM and COUNT and divides the SUM by COUNT to compute the final average.

The physical planning step can also handle redundancy. Each SUM and COUNT can be duplicated N ways. The number of duplications (replicas) may be selected in each specific case depending on predetermined criteria. Each host that gathers CPU data can send the message to N hosts (according to the node dependency shown in FIG. 3). Each of these N hosts may perform SUM and COUNT operations. The intermediate SUMS and COUNTS may also send out their results three ways for final SUM, COUNT, and DIV.

To percolate back the result of the computation, the final result messages can be sent back to the dispatchers. Each dispatcher can, in turn, message the backend node with results. The backend node may wait for these results and then select a result to return to the front end.

Thus, based on the available resources and the logical execution plan, a physical execution plan can be created, for example, as a physical execution graph. Once the backend node has computed the physical execution plan, the physical execution plan needs to be issued to the available nodes. Thus, the physical execution plan can be issued to available nodes associated with the customer. The physical execution plan can be designed for optimal parallel execution on the plurality of available nodes associated with the customer. The optimal parallel execution may include replicating the physical execution plan for executing the physical execution plan by each of the plurality of available nodes. However, only a subset of the available nodes acting as dispatchers can communicate directly with the backend node. With dispatchers 135, the number of hosts that need to be able to communicate is significantly reduced. From a security perspective, this approach can reduce the attack surface, and from a networking perspective, this approach can limit the amount of extra configuration. To issue the physical execution plan, the backend node can send the physical execution plan to a predetermined number of dispatchers.

Thus, when the physical execution plan is complete, every step, all the nodes the plan must run on, step dependencies, and next hops of steps are known. The physical execution plan is sent to the dispatchers for executing the physical execution plan by the available nodes. The dispatchers now can issue all of the steps to the available nodes (resources). A node can execute a step when all dependencies are met. Steps without dependencies (e.g., CPU) can be executed immediately. For steps with dependencies, the nodes can wait until the nodes have cached all of the dependent results before processing.

Once an issue step has been received, nodes can start waiting for timeouts on their dependencies. If a dependency times out, i.e., does not send a result before the timeout elapses, then the node is marked as timedout. Nodes that are marked as timedout can be removed from all downstream processing. To do this, timedout lists are passed with corresponding notifications. A step without a next hop is a terminal step. Completing execution of a terminal step can cause a notification to be sent to the backend.

As steps are completed, their results need to be sent to their next hops. To this end, nodes can make calls to each other and send notifying requests. The nodes can cache these results so that the nodes can execute their own steps once the dependencies are met.

The dispatchers can forward the final notification of the completion of the processing the pipeline command sequence to the backend node. The backend node can update the CSN. The notification can be used to transmit the result more than once. Specifically, when performing the physical planning, the physical execution graph (e.g., in form of a computation graph) may be replicated multiple ways so that the computation is performed redundantly, on different resources (e.g., different computers). This allows tolerating the failure of a subset of the resources. Meanwhile, this may also introduce the issue of potentially having multiple results at the end of the computation. Hence, tie breaking may be needed. To break ties, in an example embodiment, the first result wins (i.e., is taken as a final result). The backend node may check the front end cache to determine if any front end nodes are waiting for the result. As indicated earlier, one of the front end nodes can be interested in the result. To inform the front end of the result, the backend node can make a call to the front end node and send the notification with the result to the front end node. The front end node receives the result of the execution, looks up the processes waiting for the result locally, and sends the result to the computing device of the customer.

Figure 6:
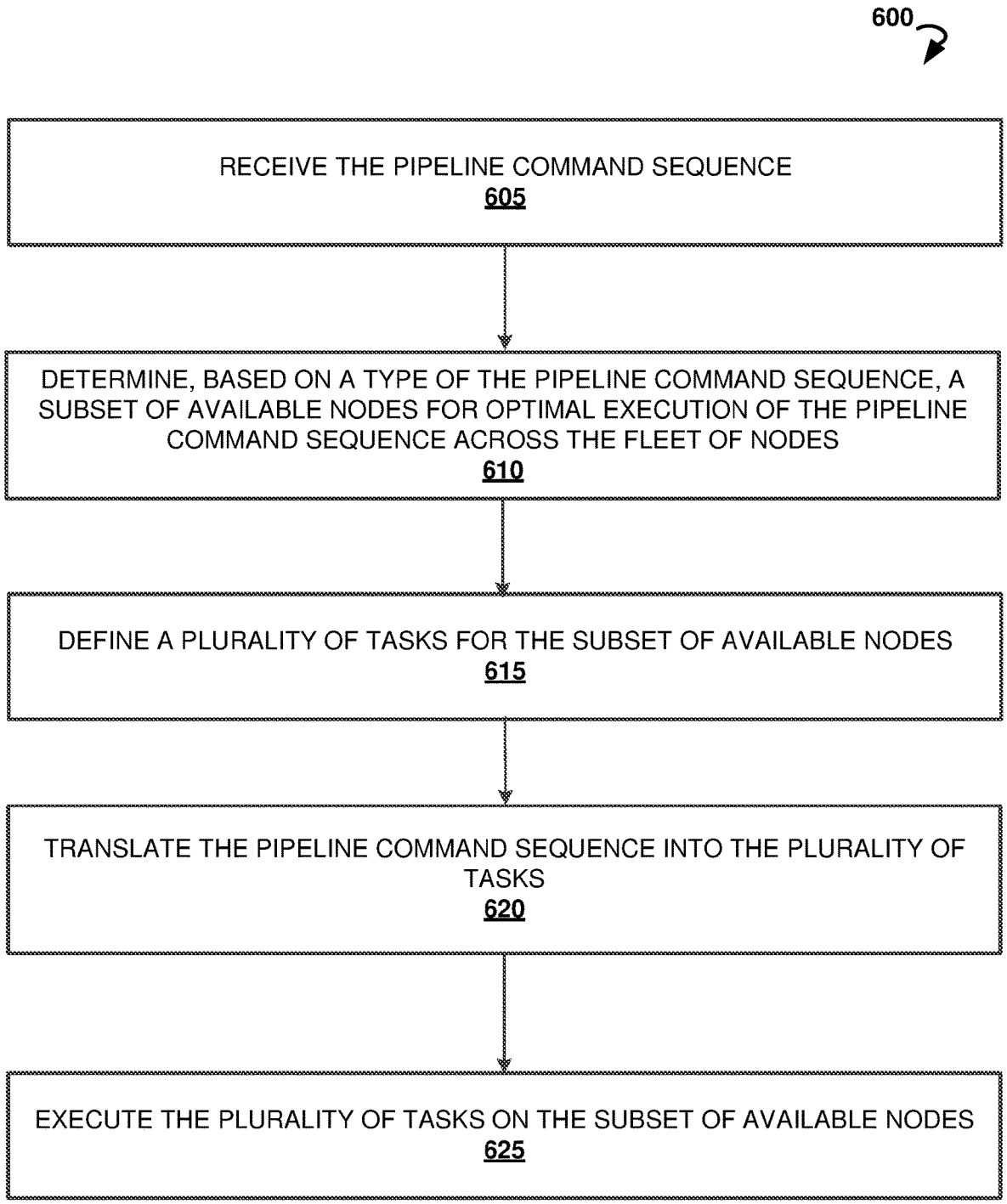
FIG. 6 is a flow chart showing a method for executing a pipeline command sequence designed for execution on a single node across a fleet of nodes, according to an example embodiment.

FIG. 6 is a flow chart showing a method 600 for executing a pipeline command sequence designed for execution on a single node across a fleet of nodes, according to an example embodiment. The method 600 can commence with receiving the pipeline command sequence at step 605. The pipeline command sequence may be made in the form for execution by a single node. The method 600 may further include determining, based on a type of the pipeline command sequence, a subset of available nodes for optimal execution of the pipeline command sequence across the fleet of nodes at step 610. In an example embodiment, upon receiving the pipeline command sequence, the pipeline command sequence may be selectively converted into a shell equivalent command designed to run on the single node. In an example embodiment, the determining the subset of available nodes includes ensuring that available nodes are available consistently.

The method 600 may continue with defining a plurality of tasks for the subset of available nodes at step 615. Upon the defining of the plurality of tasks for the subset of available nodes, a list of tasks for each of the subset of available nodes may be built. Each of the subset of available nodes may have its own plurality of tasks determined specifically for each node based on available resources (such as a processing capacity, a database type of filter, postgreSQL) of the node. The plurality of tasks may include one or more of the following: providing a resource parameter, providing a new version of software, converting the pipeline command sequence into a native shell script, distributing a code artifact, distributing a runtime version, distributing a library, and so forth. The native shell script may include a Shell or Python.

The method 600 may further include translating the pipeline command sequence into the plurality of tasks at step 620. The translation of the pipeline command sequence into the plurality of tasks may include building a tree for executing the plurality of tasks on the subset of available nodes. In an example embodiment, the translation of the pipeline command sequence into the plurality of tasks includes auto-binding of arguments across pipeline steps and language data types.

The method 600 may continue with executing the plurality of tasks on the subset of available nodes at step 625. Results of the execution of the plurality of the tasks may be reassembled into a response to the pipeline command sequence. Upon reassembling the results into the response, the response to the pipeline command sequence may be provided to a front end module.

Figure 7:
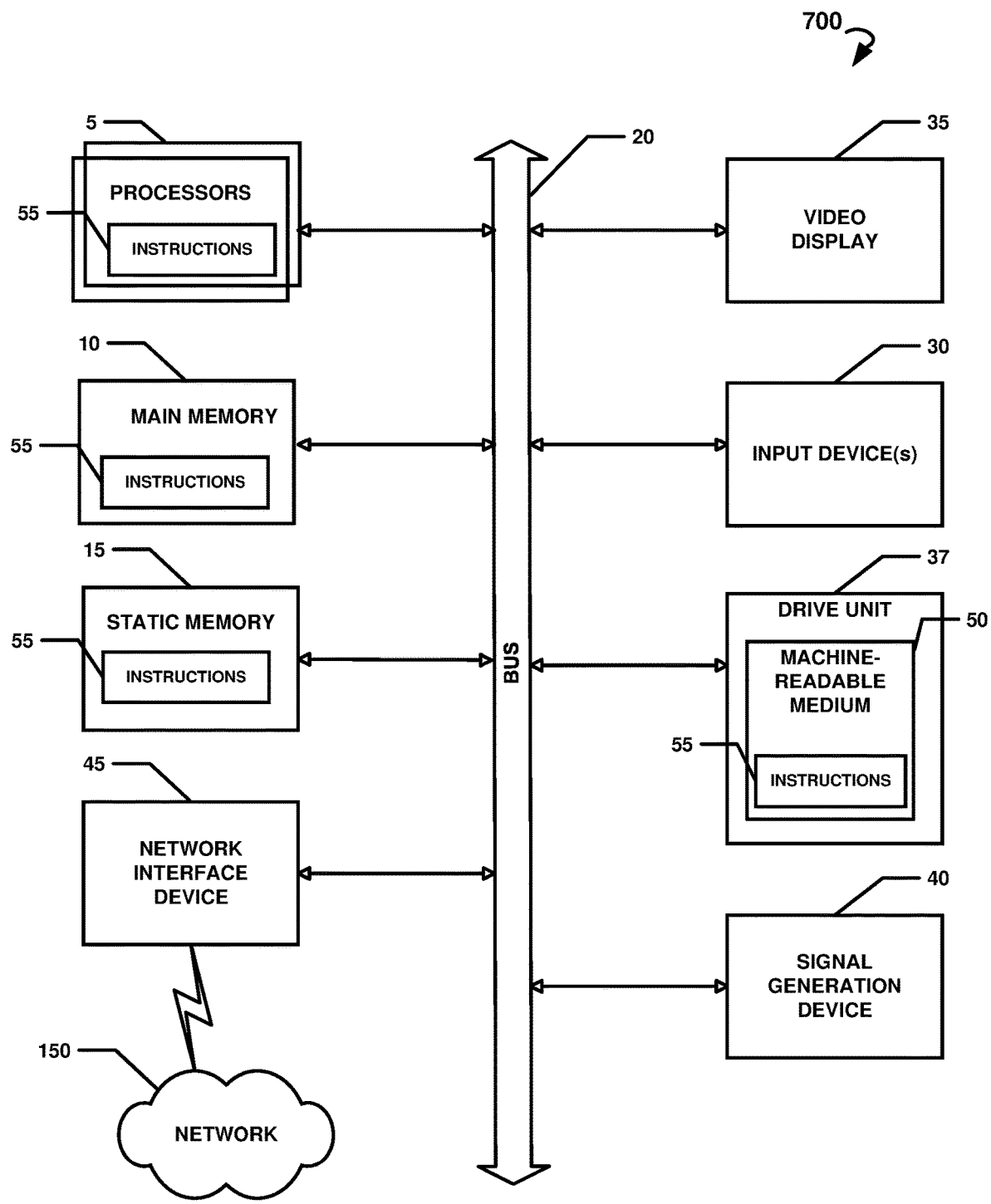
FIG. 7 is a schematic diagram of a computing system that is used to implement embodiments according to the present technology.

FIG. 7 is a diagrammatic representation of an example machine in the form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processor or multiple processor(s) 5 (e.g., a CPU, a graphics processing unit (GPU), or both), and a main memory 10 and static memory 15, which communicate with each other via a bus 20. The computer system 700 may further include a video display 35 (e.g., a liquid crystal display (LCD)). The computer system 700 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 700 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 700. The main memory 10 and the processor(s) 5 may also constitute machine-readable media.

The instructions 55 may further be transmitted or received over a network (e.g., network 150, see FIG. 1) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or steps plus functional elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems,) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, and so forth in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of a "means for" performing a task or set of tasks. It will be understood that a "means for" may be expressed herein in terms of a structure, such as a processor, a memory, an Input/Output (I/O) device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," and so forth, are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for executing a pipeline command sequence designed for execution on a single node across a fleet of nodes, the method comprising:
   receiving the pipeline command sequence;
   determining, based on a type of the pipeline command sequence, a subset of available nodes for optimal execution of the pipeline command sequence across the fleet of nodes;
   defining a plurality of tasks for the subset of available nodes;
   translating the pipeline command sequence into the plurality of tasks by auto-binding of arguments across pipeline steps and language data types; and
   executing the plurality of tasks on the subset of available nodes.

2. The method of claim 1, further comprising reassembling results of the execution of the plurality of the tasks into a response to the pipeline command sequence.

3. The method of claim 2, further comprising providing the response to the pipeline command sequence.

4. The method of claim 1, further comprising, upon receiving the pipeline command sequence, selectively converting the pipeline command sequence into a shell equivalent command designed to run on the single node.

5. The method of claim 1, wherein the translating the pipeline command sequence into the plurality of tasks includes building a tree for executing the plurality of tasks on the subset of available nodes.

6. The method of claim 1, further comprising, upon the defining of the plurality of tasks for the subset of available nodes, building a list of tasks for each of the subset of available nodes.

7. The method of claim 1, wherein the determining the subset of available nodes includes ensuring that available nodes are available without experiencing jitter, downtime, or maintenance windows.

8. A system for executing a pipeline command sequence designed for execution on a single node across a fleet of nodes, the system comprising:
   a front end module configured to:
      receive the pipeline command sequence; and
   a backend module configured to:
      determine, based on a type of the pipeline command sequence, a subset of available nodes for optimal execution of the pipeline command sequence across the fleet of nodes;
      upon receiving the pipeline command sequence, selectively convert the pipeline command sequence into a shell equivalent command designed to run on the single node;
      define a plurality of tasks for the subset of available nodes;
      translate the pipeline command sequence into the plurality of tasks; and
      execute the plurality of tasks on the subset of available nodes.

9. The system of claim 8, wherein the backend module is further configured to reassemble results of the execution of the plurality of the tasks into a response to the pipeline command sequence.

10. The system of claim 9, wherein the backend module is further configured to provide the response to the pipeline command sequence to the front end module.

11. The system of claim 8, wherein the translating the pipeline command sequence into the plurality of tasks includes building a tree for executing the plurality of tasks on the subset of available nodes.

12. The system of claim 8, wherein the backend module is further configured to, upon the defining of the plurality of tasks for the subset of available nodes, build a list of tasks for each of the subset of available nodes.

13. The system of claim 8, wherein the determining the subset of available nodes includes ensuring that available nodes are available without experiencing jitter, downtime, or maintenance windows.

14. A system for executing a pipeline command sequence designed for execution on a single node across a fleet of nodes, the system comprising:
   a front end module configured to:
      receive the pipeline command sequence; and
   a backend module configured to:
      determine, based on a type of the pipeline command sequence, a subset of available nodes for optimal execution of the pipeline command sequence across the fleet of nodes;
      upon receiving the pipeline command sequence, selectively convert the pipeline command sequence into a shell equivalent command designed to run on the single node;
      define a plurality of tasks for the subset of available nodes;
      build a list of tasks for each of the subset of available nodes;
      translate the pipeline command sequence into the plurality of tasks wherein the translating the pipeline command sequence into the plurality of tasks includes building a tree for executing the plurality of tasks on the subset of available nodes;
      execute the plurality of tasks on the subset of available nodes; and
      reassemble results of the execution of the plurality of the tasks into a response to the pipeline command sequence.

15. A method for executing a pipeline command sequence designed for execution on a single node across a fleet of nodes, the method comprising:
   receiving the pipeline command sequence;
   determining, based on a type of the pipeline command sequence, a subset of available nodes for optimal execution of the pipeline command sequence across the fleet of nodes;
   defining a plurality of tasks for the subset of available nodes, the plurality of tasks including one or more of the following: providing a resource parameter, providing a new version of software, converting the pipeline command sequence into a native shell script, distributing a code artifact, distributing a runtime version, and distributing a library, wherein the native shell script includes a Shell or Python;
   translating the pipeline command sequence into the plurality of tasks; and
   executing the plurality of tasks on the subset of available nodes.

16. A system for executing a pipeline command sequence designed for execution on a single node across a fleet of nodes, the system comprising:
   a front end module configured to:
      receive the pipeline command sequence; and
   a backend module configured to:
      determine, based on a type of the pipeline command sequence, a subset of available nodes for optimal execution of the pipeline command sequence across the fleet of nodes;
      define a plurality of tasks for the subset of available nodes, the plurality of tasks including one or more of the following: providing a resource parameter, providing a new version of software, converting the pipeline command sequence into a native shell script, distributing a code artifact, distributing a runtime version, and distributing a library, wherein the native shell script includes a Shell or Python;
      translate the pipeline command sequence into the plurality of tasks; and
      execute the plurality of tasks on the subset of available nodes.

17. The system according to claim 16, wherein the backend module converts the shell script to one or more fleet-wide parallel, distributed, scalable, and automated flows.

18. The system according to claim 16, wherein the backend module determines a largest sequence number for a request to be completed.

19. The system according to claim 18, wherein the largest sequence number comprises a checkpoint sequence number (CSN) for the pipeline command sequence.

20. The method according to claim 1, further comprising generating a governance model for controlling executions based on a number of nodes impacted and on whether a task of the plurality of tasks has been run through a testing fleet of nodes.

* * * * *